(12) United States Patent
Woods et al.

(10) Patent No.: US 6,585,839 B2
(45) Date of Patent: Jul. 1, 2003

(54) METHOD OF FABRICATING A POLYMER-MATRIX FIBER-REINFORCED COMPOSITE AND THE PRODUCT THEREOF

(75) Inventors: Jack A. Woods, Kent, WA (US);
Joseph S. Boyce, Hanover, MA (US);
Dave A. Evans, Lowell, MA (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

(21) Appl. No.: 09/906,532

(22) Filed: Jul. 16, 2001

(65) Prior Publication Data

US 2002/0112804 A1 Aug. 22, 2002

(Under 37 CFR 1.47)

Related U.S. Application Data

(63) Continuation of application No. 09/686,635, filed on Oct. 11, 2000, which is a continuation of application No. 08/394,737, filed on Feb. 27, 1995, now abandoned, which is a continuation-in-part of application No. 08/280,303, filed on Jul. 26, 1994, now abandoned, which is a continuation of application No. 08/002,700, filed on Jan. 11, 1993, now abandoned, which is a continuation of application No. 07/662,917, filed on Mar. 1, 1991, now abandoned.

(51) Int. Cl.$^7$ ............................................... B32B 31/16
(52) U.S. Cl. ................ 156/73.1; 156/308.2; 156/580.1; 156/580.2; 428/113
(58) Field of Search ...................... 156/73.1, 73.4, 156/308.2, 309.6, 324, 580.1, 580.2; 264/442, 443, 444; 428/113

(56) References Cited

U.S. PATENT DOCUMENTS 4,704,172 A * 11/1987 Katz ......................... 156/73.2
4,713,131 A 12/1987 Obeda ....................... 156/73.1
5,039,371 A 8/1991 Cremens et al. ............ 156/382

FOREIGN PATENT DOCUMENTS

| DE | 3911634 | 10/1990 |
| EP | 0007558 | 2/1980 |
| JP | 0004490 | 4/1963 |

OTHER PUBLICATIONS

Branson Sonic Power Company, Ultrasonic Plastics Assembly (1979).

Sonic Assisted Process Development, Interim Technical Report, Contract No. F33615–86–C–5041, Martin Marietta Baltimore Aerospace, Baltimore, MD (Mar. 1987).

Vijay K. Stokes, Joining Methods for Plastics and Plastic Composites: An Overview, Polymer Engineering and Science, vol. 29, No. 19 (Mid–Oct. 1989).

A. Benatar, T.G. Gutowski, Ultrasonic Welding for Thermoplastic Composites, ANTEC 507–510 (1989).

33rd International SAMPE Symposium, Ultrasonic Welding of Advanced Thermoplastic Composties (Mar. 7–10, 1988).

* cited by examiner

Primary Examiner—James Sells
(74) Attorney, Agent, or Firm—Iandiorio & Teska

(57) ABSTRACT

A method of fabricating a fiber matrix composite structure including assembling a plurality of plies of fiber-reinforced polymer-matrix material on a mandrel; engaging an ultrasonic horn with the top surface of uppermost ply; and orienting the horn at an acute angle with respect to the top surface and energizing the horn to inducing a shear force in the plies to heat and consolidate the plies.

8 Claims, 3 Drawing Sheets

METHOD OF FABRICATING A POLYMER-MATRIX FIBER-REINFORCED COMPOSITE AND THE PRODUCT THEREOF

RELATED INVENTIONS

This application is a continuation of U.S. patent application Ser. No. 09/686,635 filed Oct. 11, 2000, which is a continuation of U.S. patent application Ser. No. 08/394,737 filed Feb. 27, 1995 abandoned, which is a continuation-in-part application of U.S. application Ser. No. 08/280,303 filed Jul. 26, 1994 abandoned, which is a continuation of U.S. application Ser. No. 08/002,700 filed Jan. 11, 1993 abandoned, which is a continuation of application Ser. No. 07/662,917 filed Mar. 1, 1991 abandoned.

FIELD OF INVENTION

This invention relates to an improved method of ultrasonically consolidating layers or plies of fiber-reinforced polymer-matrix composites, and more particularly to such a method which applies the ultrasonic energy generally parallel to the surface layer to produce substantial shear in the material to effect heating. The invention also relates to the product made by that method.

BACKGROUND OF INVENTION

Composite materials are becoming more and more attractive for a wide variety of uses, from aircraft and automobiles to sporting goods and toys, because of their high stiffness and strength-to-weight ratio. A composite material is a combination of fibers in a matrix or resin. Typically, a composite structure is made of a number of layers or plies of composite material. As used herein, a composite material means a structure composed of a plurality of plies of fiber-reinforced fabric or tape in a resin matrix. Dry fabric with unidirectional fibers or woven fibers is often precombined with resin as a "PREPREG". Examples include glass or graphite fibers in a "PEEK" matrix. The fibers typically comprise more than 35% of the material. One type of composite, a thermoset composite, requires that the fiber/resin plies be laid-up, and then the composite heated to cure it. This can take a matter of hours.

As the demand for composites increases, so has the demand for faster fabrication techniques. Another type of composite material, thermoplastic composites, are faster to fabricate because there is no curing involved. The thermoplastic ply need only be heated to melt the plastic matrix, then pressed together or consolidated to the previous ply before cooling. Consolidation means laminating two or more plies together to form a part or structure. Good consolidation implies a low level of entrapped voids (typically less than 3%) and a shear strength of the ply to ply interface which approaches that of the resin matrix.

Heating the plies, however, is troublesome: a number of different heating techniques have been tried but have met with mixed success. Laser heating in the nip between the previous layer and the one being applied has not been wholly successful due to the practical problems by applying the energy at the nip. A laser apparatus with all necessary controls is also quite expensive. Infrared devices, which depend upon radiant heating, suffer from poor heat modulability and can easily damage the composite. Microwave devices suffer similar shortcomings and are potentially hazardous to surrounding personnel as well. A hot shoe technique which is commercially available uses a series of massive, heated iron-like devices. This method relies on conduction through the ply to heat the interface which makes the process a slow one. Because of size and geometry this method has only been applied to the production of flat panels, thereby restricting its usefulness. The most evaluated technique presently in use is hot gas heating. In that process a stream of hot air or gas is aimed into the nip between the new ply (layer or tape or tow) and the substrate, following which the ply is pressed or ironed onto the substrate using a pinch roller or a shoe. While the consolidation levels achieved are high the heating is difficult to modulate with respect to rapid changes in the material feed rate. This complicates the practical integration of convective, hot gas, heating with standard computer-numerical-control fabrication equipment. Moreover, despite the high consolidation some reports on the mechanical properties of the resulting composites have been disappointing. This may be due to damage or degrading of the surface of the material at the nip, especially due to the high heat applied and the large temperature differential (300° C. or more) between the hot gas stream and the melt temperature of the thermoplastic material.

Ultrasonic devices used to heat the plies have appeal for a number of reasons. Unlike convection (hot gas), conduction (hot shoes/irons), or radiation (infrared) ultrasonics does not depend upon a thermal driver to effect energy transfer to the composite material. Ultrasonic heating is instantaneously modulatable, and it provides deep, penetrating heating in the plastic matrix beyond mere surface heating.

Ultrasonic welding has long been used to weld or bond neat (unreinforced) plastics. Such welding is done by placing the horn perpendicular to two plastic layers, pressing down on the layers and energizing the horn. Obeda, U.S. Pat. No. 4,713,131, teaches joining large sheets of polypropylene plastic by overlapping the sheets of plastic and welding their edges together using an ultrasonic horn placed between the sheets. Obeda teaches nothing about composite materials.

But, others have attempted to use an ultrasonic horn to fabricate composite parts. See *Joining Methods for Plastic and Plastic Composites: An Overview*, Vijay Stokes, *Polymer Engineering and Science*, Mid-October 1989, Vol. 29, No. 19, p. 1310–1324, see specifically pp. 1322–1324, items 168–236. These previous attempts to weld thermoplastic composites during the lamination process using conventional ultrasonic welding have yielded disappointing results because, it is speculated, the presence of the fibers alters the energy transfer in the material. The conventional ultrasonic welding technique sets up a compression wavefront in the material which does not transmit well through the material. In 1987, engineers at Martin Marrietta attempted to use an ultrasonic horn to consolidate composite resin-fiber plies. The horn was placed on the top of two moving plies to be consolidated in a direction perpendicular to the plies. A range of different pressures, energy levels, and feed rates were tried. The result, however, was not satisfactory: "C-Scan results have shown that attempts to produce consolidated or near-consolidated laminates have not been successful thus far . . . " *Sonic Assisted Process Development*", Interim Technical Report," contract No. F 33615-86-5041, Martin Marrietta Baltimore for Material Laboratory Air Force Wright labs., March 1987.

Therefore, although ultrasonic horns have successfully been used to weld plastic sheets together and, to some extent, have been successfully used to weld plastics containing up to about 35% filler (such as glass or talc), the state of the art reveals no successful methodology of fabricating fiber matrix composite structures wherein an ultrasonic horn is used to consolidate the individual fiber-resin plies.

SUMMARY OF INVENTION

It is therefore an object of this invention to provide a method of fabricating a fiber matrix composite structure.

It is a further object of this invention to provide such a method which utilizes a ultrasonic horn to consolidate the fiber resin plies of the composite structure.

It is a further object of this invention to provide such a method which is controllable, instantly modulatable, and which does not require a large thermal differential between the device and the material.

It is a further object of this invention to provide such a method which is much less likely to cause overheating or damage to the material or detract from the consolidation quality.

It is a further object of this invention to provide such a method which applies heat and pressure simultaneously.

It is a further object of this invention to provide such a method which is faster and easier to employ and is less expensive both in execution and in the equipment required, and is extremely energy-efficient.

The invention results from the realization that instead of orientating an ultrasonic horn perpendicular to the resin-fiber plies during fabricating which fails to provide consolidation, if the ultrasonic horn is orientated at an acute angle to the surface of the plies of resin-fiber material so that the horn motion is generally parallel to the laminate surface, and shear force is created in the plies which heats and fully consolidates the plies.

This invention features a method of fabricating a fiber matrix composite structure and may suitably comprise, include, consist essentially of, or consist of the steps of assembling a stack of plies of fiber-reinforced polymer-matrix material on a mandrel; engaging an ultrasonic horn with the top surface of uppermost ply; and orienting the horn at an acute angle with respect to the top surface and energizing the horn to induce a shear force in the plies to heat and consolidate the plies forming a composite structure.

The plies typically comprise at least 40% fiber a consolidation force is usually applied to the plies. The consolidated force may be applied through the horn or proximate the horn. Preferably, the acute angle is less than or equal to 15 degrees.

The fiber matrix structure may be a thermoplastic polymer-matrix or a thermosetting polymer-matrix. This invention also features a composite structure made by the aforedescribed method.

DISCLOSURE OF PREFERRED EMBODIMENT

Other objects, features and advantages will occur to those skilled in the art from the following description of a preferred embodiment and the accompanying drawings, in which.

Figure 1:
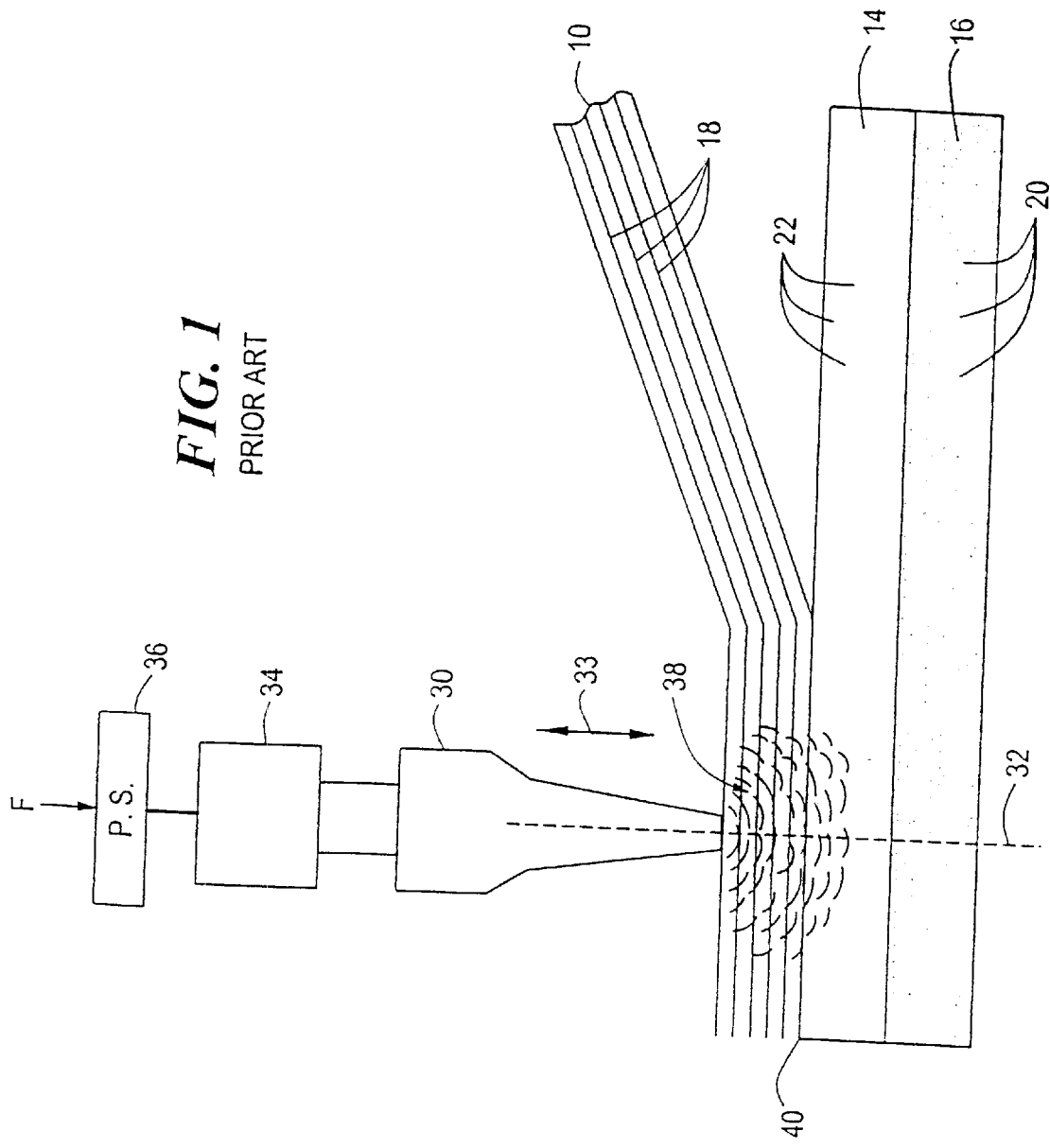
FIG. 1 is a schematic diagram illustrating a prior art method of ultrasonic welding of a thermoplastic composite.

There is shown in FIG. 1 one polymer-matrix, fiber-reinforced composite ply 10 (layer, tow, ribbon, or tape) in the process of being applied to other polymer-matrix, fiber-reinforced composite plys 14 and 16. According to the prior art methodology, the ultrasonic energy is applied to a conventional horn 30, which is vibrated in the direction shown by arrow 33 along its longitudinal axis 32 by ultrasonic transducer 34 driven by a power supply 36. Because the ultrasonic horn 30 is perpendicular to the plies, the ultrasonic or elastic waves 38 are generally understood to be compression waves 38 which move perpendicularly through ply 10 into ply 14, heating both plies 10 and 14 in order to create in a thermoplastic material sufficient heating to allow the bonding to occur at the interface under a consolidation force F applied directly through horn 30.

As explained in the Background of Invention, above, this prior art technique, where in the ultrasonic horn is placed perpendicular to the plies, has met with indifferent success. It is believed this is because the fibers in ply 10 affect and dissipate the energy before it can be converted to heat an interface 40 between ply 10 and ply 14. A horn placed perpendicular to the plies did not result in successful consolidation. See, e.g. the Martin Marretta report cited in the Background of Invention above.

Figure 2:
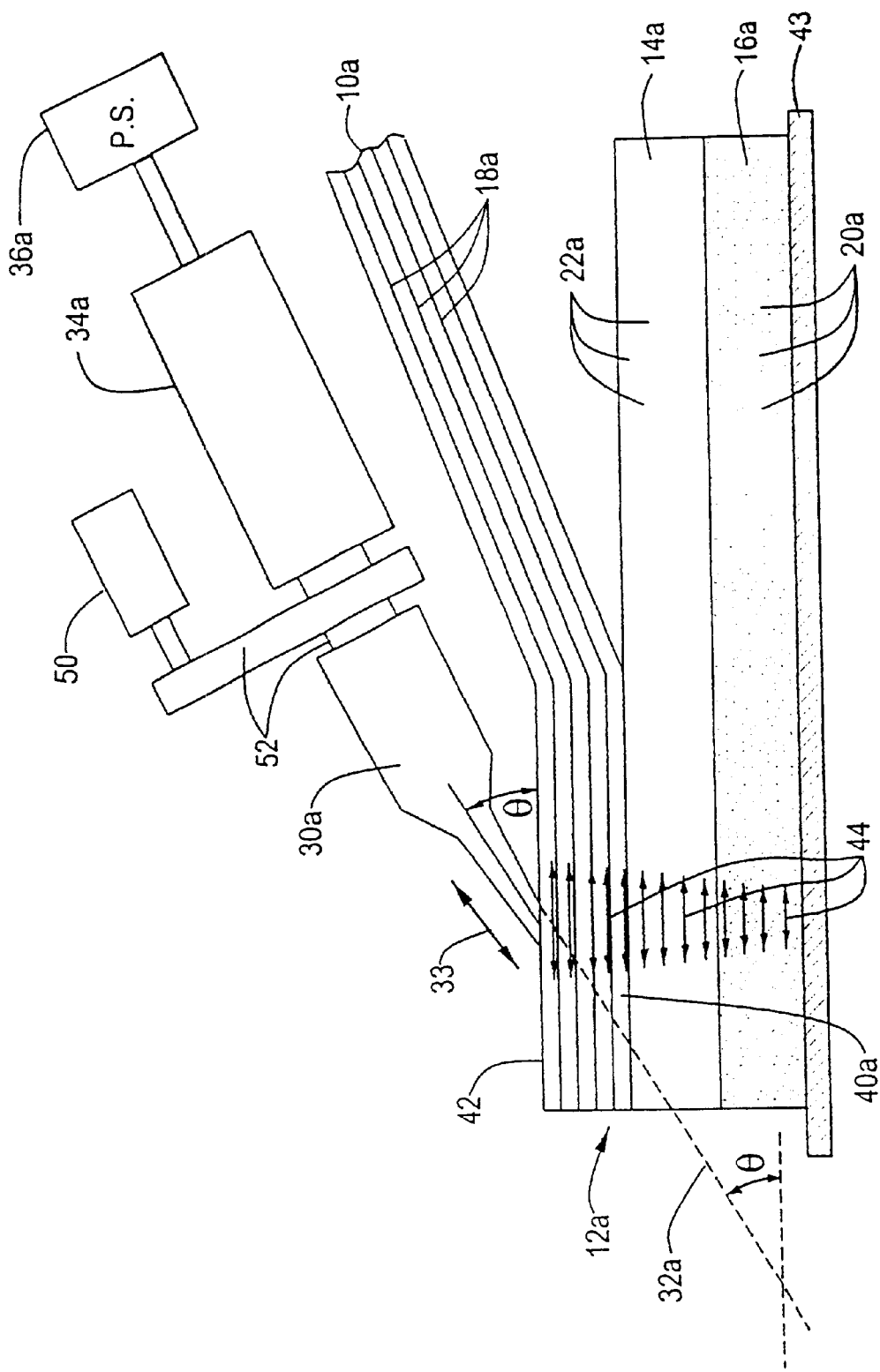
FIG. 2 is a schematic illustration of an ultrasonic method of laminating a fiber/polymer matrix according to this invention with the consolidation force applied through the ultrasonic horn.

In accordance with this invention, however, the ultrasonic horn 30a is disposed at an acute angle to the surface 42 of upper most ply 10a. Preferably, an angle of under 45° is used and surprisingly good results have been obtained with an angle of approximately 15°, as depicted in FIG. 2. As opposed to a perpendicularly oriented horn, the angled horn vibration occurs, as indicated by arrow 33, longitudinally, generally parallel to the longitudinal axis of horn 30a. But in this case the vibrations induced in the material, namely ply 10a and 14a, are generally parallel with the surface 42 of laminate 12a but propagate perpendicular to the surface 42. The vibration of horn 30a apparently sets up shear in plies 10a and 14a in a direction generally parallel to surface 42 as indicated by arrows 44. With this orientation, tests have shown that the heating and consolidation are substantially superior to the prior art, as shown in FIG. 1. It is important that the horn is in intimate contact with the composite material. The force behind this contact is a controlling variable relating to the successful operation of ultrasonic device. The force should be applied at or near a prescribed location along the ultrasonic device so as not to adversely affect the desired ultrasonic vibrations. The component of the ultrasonic device to which the force is routinely applied is specially designed and is commonly located between and rigidly attached to the horn and the transducer. This component, conventionally referred to as a booster, is in turn mounted in a force insensitive manner so as to isolate the ultrasonic device from any surrounding fixture(s). Although other ways of applying contact forces are also used, the force may be applied as follows: force application 50 contacts the booster 52. The force application 50 may be a spring, electrically driven solenoid or motor drive electromechanical device. Hydraulic or pneumatic actuators could also be used. The plies 10a, 14a and 16a to be consolidated are placed on mandrel 43 as shown.

In operation, horn 30a may be drawn along, as to the right in FIG. 2, to perform continuous consolidation such as is required in a filament-winding or tape-laying operations in the fabrication of composites. In one embodiment, transducer 34a was operated at 40 MHz, although other frequencies may be used.

Figure 3:
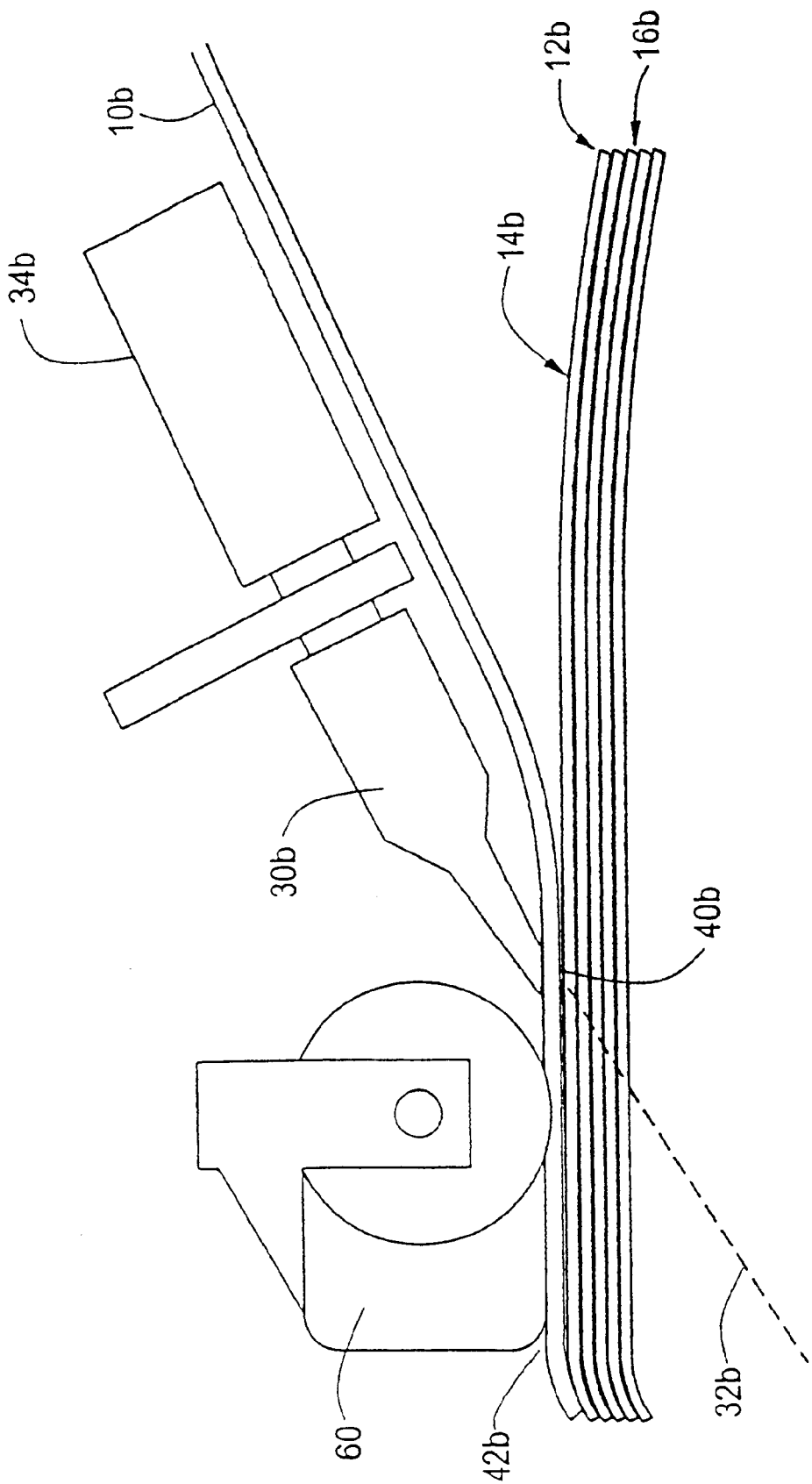
FIG. 3 is a view similar to FIG. 2 with the consolidation force applied by a separate pressure shoe.

Pressure required for consolidation (or to prevent deconsolidation prior to cooling below the melt) may also be applied by a separate member, such as a shoe or roller 60, FIG. 3, which is proximate horn 30b. If horn 30b is moving across the surface 42b, then shoe 60 extends the period of time when the consolidation force is applied over the situation when the consolidation force is applied only by the horn itself.

The fiber reinforcement of each ply may be in the same direction in each ply but typically is not; as indicated in FIG. 2, the fibers 18*a* in ply 10*a* run longitudinally of the plane of the drawing, while the fibers 20*a* in ply 16*a* run perpendicular to the plane of the drawing, and fibers 22*a* in ply 14*a* run at an angle to the plane of the drawing. Although in FIG. 2 the fibers in the incoming material are indicated in an orderly array, they may be random, they may be woven or unidirectional, they may be made of various materials such as glass, carbon, aramid or ceramic substances. The resin matrix may be either a thermosetting material or a thermoplastic material. For a thermoplastic resin based material, the consolidation action can be completed using the application of ultrasonic energy and pressure. For a thermosetting material, the ultrasonic energy is used only to soften the material and bring it to a tacky condition. For full setting, the thermosetting material must be subjected to a secondary heating source for a period of time to cure.

Process optimization trials were conducted using a 40 Mhz ultrasonic horn and power supply provided by Branson systems mounted on an EnTec 3-axis filament winding machine. A support frame was attached to the winder which accommodated the horn, mounting points for pneumatic cylinders which apply pressure on the horn tip, and a steel follower roller. This system was used to wind 5⅜ in diameter cylinder from ¼ in. width APC-2 PEEK/AS-4 tape at ±45° over an aluminum mandrel covered with a 0.125 in. layer of RTV rubber. Major process parameters (amplitude, pressure, and advance rate) were varied according to an experimental plan based on Taguchi Method to determine optimum process conditions. A maximum average short beam shear strength as determined by the ASTM D-23344 test method of 7990 psi was obtained with the horn operating at 100% of power supply rated amplitude and a pressure of 140 psi on the horn tip at an advance rate of 49 in/min.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of fabricating a fiber matrix composite structure, the method comprising:
   assembling a stack of plies of fiber-reinforced polymer-matrix material on a mandrel in which said piles comprise at least 40% fiber;
   engaging an ultrasonic horn with the top surface of uppermost ply; and
   orientating said horn at an acute angle with respect to the top surface and energizing said horn to induce a shearing motion in the plies to heat and consolidate said plies forming a composite structure.

2. The method of claim 1 further including applying a consolidation force to said plies.

3. The method of claim 2 in which said consolidation force is applied through said horn.

4. The method of claim 2 in which said consolidation force is applied proximate said horn by a roller.

5. The method of claim 1 in which said acute angle is less than or equal to 15 degrees.

6. The method of claim 1 in which said fiber matrix structure includes a thermoplastic polymer-matrix.

7. The method of claim 1 in which said fiber matrix structure includes a thermosetting polymer-matrix.

8. A fiber matrix composite structure manufactured by the process comprising:
   assembling a stack of plies of fiber-reinforced polymer-matrix material on a mandrel in which said plies comprise at least 40% fiber;
   engaging an ultrasonic horn with the top surface of uppermost ply; and
   orientating said horn at an acute angle with respect to the top surface and energizing said horn to induce a shearing motion in the plies to heat and consolidate said plies forming a composite structure.

* * * * *

UNITED STATES PATENT AND TRADEMARK OFFICE
CERTIFICATE OF CORRECTION

PATENT NO. : 6,585,839 B2
DATED : July 1, 2003
INVENTOR(S) : Woods et al.

It is certified that error appears in the above-identified patent and that said Letters Patent is hereby corrected as shown below:

Column 4,
Line 60, please change "MHz" to -- kHz -- .

Column 5,
Line 20, please change "Mhz" to -- kHz -- .

Signed and Sealed this

Twenty-second Day of June, 2004

JON W. DUDAS
*Acting Director of the United States Patent and Trademark Office*